US011178885B2

United States Patent
Hori et al.

(10) Patent No.: US 11,178,885 B2
(45) Date of Patent: Nov. 23, 2021

(54) TRANSESTERIFIED OIL AND PLASTIC OIL/FAT COMPOSITION USING SAME AS HARDSTOCK

(71) Applicant: FUJI OIL HOLDINGS INC., Osaka (JP)

(72) Inventors: Katsuhito Hori, Osaka (JP); Hitomi Omori, Osaka (JP)

(73) Assignee: FUJI OIL HOLDINGS INC., Osaka (JP)

( * ) Notice: Subject to any disclaimer, the term of this patent is extended or adjusted under 35 U.S.C. 154(b) by 384 days.

(21) Appl. No.: 16/079,012

(22) PCT Filed: Feb. 17, 2017

(86) PCT No.: PCT/JP2017/005842
§ 371 (c)(1),
(2) Date: Aug. 22, 2018

(87) PCT Pub. No.: WO2017/145927
PCT Pub. Date: Aug. 31, 2017

(65) Prior Publication Data
US 2019/0053510 A1    Feb. 21, 2019

(30) Foreign Application Priority Data
Feb. 22, 2016   (JP) .............................. JP2016-031152

(51) Int. Cl.
| | |
|---|---|
| A23D 7/015 | (2006.01) |
| A23D 7/00 | (2006.01) |
| A23D 9/00 | (2006.01) |
| C11C 3/10 | (2006.01) |
| C11C 3/00 | (2006.01) |

(52) U.S. Cl.
CPC ............... *A23D 7/015* (2013.01); *A23D 7/00* (2013.01); *A23D 9/00* (2013.01); *C11C 3/00* (2013.01); *C11C 3/10* (2013.01)

(58) Field of Classification Search
CPC .. A23D 7/00; A23D 7/015; C11C 3/00; C11C 3/10
See application file for complete search history.

(56) References Cited

U.S. PATENT DOCUMENTS

| | | | |
|---|---|---|---|
| 2010/0291283 A1 | 11/2010 | Andou et al. | |
| 2011/0039008 A1 | 2/2011 | Oonishi et al. | |
| 2012/0040077 A1* | 2/2012 | Sakai | C11C 3/00 |
| | | | 426/606 |
| 2014/0377445 A1 | 12/2014 | Ohara et al. | |

FOREIGN PATENT DOCUMENTS

| | | |
|---|---|---|
| CN | 102726547 | 10/2012 |
| GB | 1481418 | 7/1977 |
| JP | 2000129286 | 5/2000 |
| JP | 2001139983 | 5/2001 |
| JP | 2002253117 | 9/2002 |
| JP | 2003003195 | 1/2003 |
| JP | 2005113153 | 4/2005 |
| JP | 2005120386 | 5/2005 |
| JP | 2007282606 | 11/2007 |
| JP | 2010144158 | 7/2010 |
| JP | 2010148385 | 7/2010 |
| JP | 2014055279 | 3/2014 |
| JP | 2014207890 | 11/2014 |
| WO | 2016143530 | 9/2012 |
| WO | 2015047170 | 4/2015 |

OTHER PUBLICATIONS

Haumann, "Fat Modification". INFORM, vol. 5, No. 6 (Jun. 1994) (Year: 1994).*
Gunstone et al., "The Lipid Handbook—Chapter 4.3". 3rd edition, CRC Press (2007) (Year: 2007).*
Liu et al., "High-oleic canola oils and their food applications". available online at https://www.aocs.org/stay-informed/inform-magazine/featured-articles/high-oleic-canola-oils-and-their-food-applications-september-2012?SSO=True (Year: 2012).*
"Search Report of Europe Counterpart Application", dated Jan. 8, 2019, p. 1-p. 9.
"International Search Report (Form PCT/ISA/210)", dated Mar. 14, 2017, with English translation thereof, pp. 1-4.
"Office Action of Europe Counterpart Application," dated Sep. 17, 2019, p. 1-p. 3.

* cited by examiner

*Primary Examiner* — Erik Kashnikow
*Assistant Examiner* — Assaf Zilbering
(74) *Attorney, Agent, or Firm* — JCIPRNET

(57) ABSTRACT

The present invention addresses the problem of providing: transesterified oil which has reduced saturated fatty acids and transfat contents, and which provides good properties when used as hard stock for a plastic oil/fat composition; and a plastic oil/fat composition using the transesterified oil/fat. The present invention provides a non-selective transesterified oil/fat in which contents of saturated fatty acid, saturated fatty acid having 12 carbons, and unsaturated fatty acid in the constituent fatty acids are adjusted.

10 Claims, No Drawings

TRANSESTERIFIED OIL AND PLASTIC OIL/FAT COMPOSITION USING SAME AS HARDSTOCK

CROSS-REFERENCE TO RELATED APPLICATION

This application is a 371 of international application of PCT application serial no. PCT/JP2017/005842, filed on Feb. 17, 2017, which claims the priority benefit of Japan application no. 2016-031152, filed on Feb. 22, 2016. The entirety of each of the abovementioned patent applications is hereby incorporated by reference herein and made a part of this specification.

TECHNICAL FIELD

The present invention relates to a transesterified oil and a plastic oil and fat composition using the same as a hardstock.

BACKGROUND ART

Many studies have been conducted so far in order to reduce an oily feeling of plastic oil and fat compositions such as a margarine or shortening and improve mouthfeel properties.

When a plastic oil and fat composition such as a margarine or shortening is produced, physical properties thereof are adjusted by adjusting a melting point, an SFC, and the like of oils and fats used. In general plastic oil and fat compositions, physical properties of oils and fats are directly connected to physical properties such as spreading properties of oil and fat compositions at low temperatures, bleed-out properties of a liquid oil at high temperatures, mouthfeel properties, and graining properties. In addition, generally, a plastic oil and fat composition has more favorable mouthfeel properties when an amount of low melting point oils and fats such as a liquid oil mixed in is larger.

Thus, when a plastic oil and fat composition is produced, a method in which an appropriate amount of high melting point oils and fats is mixed into low melting point oils and fats mainly containing a liquid oil, and thus uniform physical properties and favorable mouthfeel properties are obtained is performed.

This high melting point part is particularly called a hardstock and greatly contributes to spreading properties at low temperatures which are important as physical properties of margarines and fatspreads, bleed-out properties of a liquid oil at high temperatures, mouthfeel properties, and graining properties. In addition, hardstocks are mainly used as a part of oil and fat formulations in oily foodstuffs, and if hardness can be effectively imparted with a smaller amount thereof, an overall oily foodstuff formulation can be designed more freely, which is beneficial in many cases.

In oils and fats used for this hardstock, when a content of trans acids in a hardened oil is increased, it is possible to obtain a margarine or a fatspread having favorable bleed-out properties of a liquid oil at high temperatures and favorable mouthfeel properties and graining properties. Therefore, a hardened oil obtained by hydrogenating a liquid oil and having a melting point of about 35° C. to 40° C. is used.

The risk posed by trans acids on health is a problem from a nutritional point of view. Therefore, there is a demand for lowering an amount of trans isomers contained in a hardened oil or an oil and fat composition containing no hardened oils, and thus transesterified oils with a melting point of 35 to 45° C. is used (refer to Patent Literatures 1 to 6).

CITATION LIST

Patent Literatures

[Patent Literature 1]
 Japanese Unexamined Patent Application Publication No. 2001-139983
[Patent Literature 2]
 Japanese Unexamined Patent Application Publication No. 2002-253117
[Patent Literature 3]
 Japanese Unexamined Patent Application Publication No. 2003-003195
[Patent Literature 4]
 Japanese Unexamined Patent Application Publication No. 2005-113153
[Patent Literature 5]
 Japanese Unexamined Patent Application Publication No. 2005-120386
[Patent Literature 6]
 Japanese Unexamined Patent Application Publication No. 2007-282606

SUMMARY OF INVENTION

Technical Problem

Transesterified oils of the related art have a problem that a solidification rate which is important for a hardstock of a plastic oil and fat composition is inferior to that of partially hydrogenated oils and fats.

When a solidification rate of transesterified oils is higher, an SFC % in a high temperature range of 30° C. or 35° C. is higher. Therefore, since mouthfeel properties are inferior to those of partially hydrogenated oils and fats, there is a quality problem that too much cannot be mixed into the plastic oil and fat composition. In addition, in recent years, it has been desired to reduce the amount of saturated fatty acids as well as trans acids.

An objective of the present invention is to obtain transesterified oils having small contents of saturated fatty acids and trans acids and favorable physical properties as a hardstock for a plastic oil and fat composition and a plastic oil and fat composition using the same.

Solution to Problem

In view of the above circumstances, the inventors conducted extensive studies and as a result, completed the present invention by adjusting a content of saturated fatty acids in constituent fatty acids of raw oil and fat materials of non-selective transesterified oils.

That is, the present invention is as follows.
(1) A non-selective transesterified oil in which a content of saturated fatty acids in constituent fatty acids is 70 to 85 weight %, a content of saturated fatty acids having 12 carbon atoms (hereinafter referred to as C12) is less than 10 weight %, and a content of unsaturated fatty acids in constituent fatty acids is 15 to 30 weight %.
(2) The non-selective transesterified oil according to (1), wherein a content of monounsaturated fatty acids having 18 carbon atoms (hereinafter referred to as C18:1) is 10 to 25 weight %.

(3) The non-selective transesterified oil according to (1) or (2), wherein compositional ratios between saturated fatty acids having 16 carbon atoms (hereinafter referred to as C16), saturated fatty acids having 18 carbon atoms (hereinafter referred to as C18), and saturated fatty acids having 22 carbon atoms (hereinafter referred to as C22) satisfy all of the following formulae:

$$0.2 \leq C16/C18 \leq 2.0$$

$$5.0 \leq C16/C22 \leq 30.0$$

$$5.0 \leq C18/C22.$$

(4) The non-selective transesterified oil according to any one of (1) to (3),
wherein a rising melting point is 45 to 60° C.
(5) A plastic oil and fat composition containing 30 to 5 weight % of the non-selective transesterified oil according to any one of (1) to (4) and 70 to 95 weight % of a liquid oil.
(6) The plastic oil and fat composition according to (5), wherein a content of saturated fatty acids in the plastic oil and fat composition is 25 weight % or less.
(7) The plastic oil and fat composition according to (5) or (6),
wherein a content of trans acids in the plastic oil and fat composition is 2.0 g/100 g or less.
(8) The plastic oil and fat composition according to any one of (5) to (7),
wherein, when the plastic oil and fat composition is melted at 60° C. and then left at 15° C., and a time taken for an SFC % of oils and fats to reach 14% is within 10 minutes.

Effects of Invention

According to the present invention, it is possible to obtain transesterified oils having small contents of saturated fatty acids and trans acids and favorable physical properties as a hardstock for a plastic oil and fat composition and a plastic oil and fat composition using the same.

As a further preferable aspect, the transesterified oil of the present invention has an excellent solidification rate which is important for a hardstock of a plastic oil and fat composition. When the transesterified oil of the present invention is used as a hardstock of a plastic oil and fat composition, it is possible to obtain a plastic oil and fat composition with a small amount of a liquid oil bleeding out and reduced occurrence of graining and which has effects of exhibiting favorable physical properties such as mouthfeel properties and spreading properties at low temperatures.

DESCRIPTION OF EMBODIMENTS

A non-selective transesterified oil of the present invention is a non-selective transesterified oil prepared by adjusting a fatty acid composition, and can be appropriately used as a hardstock.

In addition, the non-selective transesterified oil of the present invention is prepared according to non-selective transesterification with a metal catalyst such as sodium methylate or a randomized transesterified lipase.

In the non-selective transesterified oil of the present invention, a content of saturated fatty acids in constituent fatty acids is 70 to 85 weight %, and preferably 80 to 85 weight %. In these, there is less than 10 weight % of C12, and preferably less than 5 weight %.

In the non-selective transesterified oil of the present invention, a content of unsaturated fatty acids in constituent fatty acids is 15 to 30 weight % and preferably the content of C18:1 is 10 to 25 weight %. More preferably, a content of unsaturated fatty acids is 15 to 20 weight %, and the content of C18:1 is 15 to 20 weight %.

In the non-selective transesterified oil of the present invention, compositional ratios of C16, C18, and C22 preferably satisfy all of the following formulae:

$$0.2 \leq C16/C18 \leq 2.0$$

$$5.0 \leq C16/C22 \leq 30.0$$

$$5.0 \leq C18/C22.$$

In the non-selective transesterified oil of the present invention, more preferably, a compositional ratio of C16 and C18 satisfies $0.5 \leq C16/C18 \leq 1.0$, and still more preferably satisfies $0.5 < C16/C18 < 1.0$.

In the non-selective transesterified oil of the present invention, more preferably, a compositional ratio of C16 and C22 satisfies $8.0 \leq C16/C22 \leq 20.0$, and still more preferably satisfies $8.0 < C16/C22 \leq 15.0$.

In the non-selective transesterified oil of the present invention, more preferably, a compositional ratio of C18 and C22 satisfies $7.0 \leq C18/C22$, and still more preferably satisfies $10.0 \leq C18/C22$.

Adjustment for the non-selective transesterified oil of the present invention may be performed within the above ranges. However, examples of oils and fats that can be used as a raw material of the transesterified oil include vegetable oils and fats such as soybean oil, rapeseed oil, corn oil, cottonseed oil, peanut oil, sunflower oil, rice bran oil, safflower oil, olive oil, sesame oil, palm oil, coconut oil, and palm kernel oil, an animal fat such as milk fat, beef tallow, and lard, their hardened oils, fractionated oils, hardened fractionated oils, fractionated hardened oils, processed oils and fats subjected to transesterification or the like, and mixed oils and fats thereof.

Preferable examples of vegetable oils and fats include soybean oil, rapeseed oil, corn oil, cottonseed oil, peanut oil, sunflower oil, rice bran oil, safflower oil, and palm oil, and their hardened oils, fractionated oils, hardened fractionated oils, fractionated hardened oils, processed oils and fats subjected to transesterification or the like, and mixed oils and fats thereof.

More preferable examples of vegetable oils and fats include soybean oil, rapeseed oil, corn oil, cottonseed oil, sunflower oil, rice bran oil, safflower oil, and palm oil, and their hardened oils, fractionated oils, hardened fractionated oils, fractionated hardened oils, and processed oils and fats subjected to transesterification or the like, and mixed oils and fats thereof.

Still more preferable examples of vegetable oils and fats include rapeseed oil, corn oil, sunflower oil, safflower oil, and palm oil, and their hardened oils, fractionated oils, hardened fractionated oils, and fractionated hardened oils, and processed oils and fats subjected to transesterification or the like, and mixed oils and fats thereof.

Most preferably, extremely hardened palm oil, extremely hardened high erucic acid rapeseed oil, and sunflower oil are preferably used.

More preferably, extremely hardened palm oil, extremely hardened high erucic acid rapeseed oil, and sunflower oil are mixed in in ranges of 60 weight % to 90 weight %, 1 weight % to 10 weight %, and 10 weight % to 30 weight %, respectively.

When the fatty acid composition of the non-selective transesterified oil is not in the above ranges, physical properties of a margarine or a fatspread which is a plastic oil and fat composition using the non-selective transesterified oil as a hardstock may deteriorate.

The non-selective transesterified oil of the present invention can be directly used as a hardstock. However, an emulsifier such as a glycerin fatty acid ester, a sucrose fatty acid ester, a propylene glycol fatty acid ester, a polyglycerin fatty acid ester and lecithin can be appropriately added for use.

When the hardstock obtained using the non-selective transesterified oil of the present invention is mixed with a liquid oil, a plastic oil and fat composition such as margarines and fatspreads can be produced. As the liquid oil, any one or a mixture of rapeseed oil, soybean oil, sunflower seed oil, cottonseed oil, peanut oil, rice bran oil, corn oil, safflower oil, kapok oil, sesame oil, and evening primrose oil can be exemplified and any of these may be used.

As an exemplary method of producing the plastic oil and fat composition of the present invention, a mixed oil in which 5 to 30 weight % of the hardstock and 70 to 95 weight % of a liquid oil are mixed is rapidly cooled and kneaded according to a conventional method and thereby the plastic oil and fat composition of the present invention is produced. When mixing proportions of the hardstock are too far below the above ranges, bleed-out resistance of a liquid oil at high temperatures deteriorates, and when mixing proportions of the hardstock are too far above, spreading properties at low temperatures and mouthfeel properties tend to deteriorate.

When the plastic oil and fat composition produced using the hardstock in the present invention is melted at 60° C. and then left at 15° C., a time taken for an SFC % of oils and fats to reach 14% is preferably within 10 minutes in consideration of solidification properties.

EXAMPLES

While the present invention will be described below in further detail with reference to examples, the present invention is not limited to these examples. Here, in the examples, "%" and "parts" are both based on weight.
(Preparation of hardstock)

EXAMPLE 1, AND COMPARATIVE EXAMPLES 1 AND 2

Oil and fat raw materials were mixed so that contents of saturated fatty acids and unsaturated fatty acids, and contents of C12, C16, C18, C18:1, and C22 were those shown in Table 1 and then a chemical transesterification reaction was caused.

Example 1 was prepared according to a chemical transesterification reaction of oils and fats with a formulation of 75 weight % of extremely hardened palm oil, 5 weight % of extremely hardened high erucic acid rapeseed oil, and 20 weight % of sunflower oil.

Comparative Example 1 was prepared according to a chemical transesterification reaction of oils and fats with a formulation of 66 weight % of palm stearin, 31 weight % of palm oil, and 3 weight % of extremely hardened high erucic acid rapeseed oil.

Comparative Example 2 was prepared according to a chemical transesterification reaction of oils and fats with a formulation of 52 weight % of rapeseed oil, 38 weight % of palm kernel oil, and 10 weight % of extremely hardened high erucic acid rapeseed oil.

The chemical transesterification reaction was caused as follows. To the oils and fats, 0.3 weight % of sodium methylate was added thereto, and a random transesterification reaction was caused under a reduced pressure at 80° C. for 30 minutes. After the random transesterification reaction, the oils and fats were neutralized and washed with a 50 weight % citric acid aqueous solution. An amount of the citric acid aqueous solution added was 5 weight % with respect to oils and fats. After washing with citric acid, the oils and fats were washed with water. An amount of water used for washing was 20 weight % with respect to oils and fats.

After washing was performed with water, the oils and fats were purified, and used for the later examination. Purification conditions of oils and fats were as follows. Bleaching conditions: 1.5 weight % of white clay was added to oils and fats, and a bleaching operation was then performed under a reduced pressure at 110° C. for 10 minutes.

Deodorizing condition: a deodorization operation was performed under a reduced pressure at 240° C.±5° C. for 90 minutes.

An amount of steam blown during the deodorization operation was 5 weight % of the weight of the oil and fat subjected to the deodorization operation.

Comparative Examples 3 and 4

In Comparative Example 3, an extremely hardened oil and fat of palm oil was used. In Comparative Example 4, extremely hardened high erucic acid rapeseed oil was used. Contents of saturated fatty acids and unsaturated fatty acids, and contents of C12, C16, C18, C18:1, and C22 are shown in Table 1.

TABLE 1

| | Content of unsaturated fatty acids | Content of saturated fatty acids | C12 | C16 | C18 | C18:1 | C22 | C16/C18 | C18/C22 | C16/C22 |
| --- | --- | --- | --- | --- | --- | --- | --- | --- | --- | --- |
| Example 1 | 18.8 | 81.2 | 0.0 | 33.9 | 43.5 | 17.5 | 2.5 | 0.8 | 17.4 | 13.6 |
| Comparative Example 1 | 38.3 | 61.7 | 0.5 | 51.6 | 6.4 | 31.5 | 1.4 | 8.1 | 4.6 | 36.9 |
| Comparative Example 2 | 2.2 | 97.8 | 16.6 | 7.4 | 60.8 | 0.0 | 5.3 | 0.1 | 11.5 | 1.4 |
| Comparative Example 3 | 1.8 | 98.2 | 0.0 | 43.7 | 54.5 | 0.8 | 0.0 | 0.8 | — | — |
| Comparative Example 4 | 0.4 | 99.6 | 0.0 | 3.6 | 40.7 | 0.0 | 46.1 | 0.1 | 0.9 | 0.1 |

Adjustment of Oils and Fats Using Margarine

In all of Example 1 and Comparative Examples 1, 2, 3, and 4, rapeseed oil was used as a liquid oil. An amount of rapeseed oil mixed in was adjusted so that contents of saturated fatty acids in margarine oils and fats used in test groups were the same. In addition, contents of saturated fatty acids of oils and fats, a rapid cooling SFC, and a rising melting point are shown in Table 2.

TABLE 2

| Hardstock used | Formulation (%) | | Saturated fatty acids (%) | Content of trans acids (g/100 g) | SFC (%) | | | | | | Rising melting point (° C.) |
|---|---|---|---|---|---|---|---|---|---|---|---|
| | Rapeseed oil | Hardstock | | | 10° C. | 15° C. | 20° C. | 25° C. | 30° C. | 35° C. | |
| Example 1 | 78 | 22 | 23.0 | 1.2 | 19.5 | 17.4 | 15.2 | 13.4 | 11.2 | 9.3 | 42.1 |
| Comparative Example 1 | 70 | 30 | 23.1 | 1.4 | 19.5 | 15.4 | 12.0 | 9.3 | 6.7 | 5.0 | 36.8 |
| Comparative Example 2 | 82 | 18 | 23.0 | 1.2 | 16.6 | 14.8 | 12.9 | 10.8 | 8.3 | 6.3 | 38.6 |
| Comparative Example 3 | 82 | 18 | 23.1 | 1.2 | 19.3 | 18.8 | 17.7 | 16.9 | 15.7 | 14.1 | 48.8 |
| Comparative Example 4 | 82 | 18 | 23.3 | 1.2 | 19.6 | 18.6 | 18.1 | 17.7 | 17.2 | 15.7 | 55.7 |

Comparative Examples 3 and 4, in which an extremely hardened oil was used, had a high SFC % at 30° C. or 35° C. of 14.1% or 15.7%, and very poor mouthfeel properties and thus were not satisfactory.

Hardstocks of Example 1 and Comparative Examples 1 and 2 were prepared according to formulations as shown in Table 2. The adjusted oils and fats were melted at 60° C. and then left at 15° C., and solidification rates of the plastic oil and fat compositions were compared according to an SFC % at each of elapsed times. The results are shown in Table 3.

TABLE 3

| | Time (min)/SFC % | | | | | | | | | | | |
|---|---|---|---|---|---|---|---|---|---|---|---|---|
| Hardstock used | 0 min | 2 min | 4 min | 6 min | 8 min | 10 min | 15 min | 20 min | 25 min | 30 min | 45 min | 60 min |
| Example 1 | 0 | 9.8 | 12.8 | 13.4 | 14.1 | 14.9 | 16.5 | 17.3 | 17.6 | 17.8 | 17.9 | 17.8 |
| Comparative Example 1 | 0 | 6.3 | 7.8 | 8.1 | 8.3 | 8.8 | 12.4 | 13.1 | 13.6 | 14.1 | 13.9 | 14.0 |
| Comparative Example 2 | 0 | 1.6 | 6.5 | 7.4 | 8.2 | 8.9 | 11.2 | 11.6 | 11.7 | 11.8 | 12.2 | 12.5 |

The solidification rate at 15° C. was measured in Example 1, and Comparative Examples 1 and 2. The results were that a time required for an SFC % to reach 14% was within 10 minutes for Example 1, and was 30 minutes for Comparative Example 1 and an SFC % at 15° C. did not reach 14% or more for Comparative Example 2.

Prototype of Margarine

Margarine was prototyped using the plastic oil and fat composition obtained by preparing the hardstocks of Example 1 and Comparative Examples 1 and 2 according to the formulations shown in Table 2.

84 parts by weight of the plastic oil and fat composition and 16 parts by weight of water were prepared. Next, 0.01 parts by weight of a glycerin fatty acid ester was added as an emulsifier. The mixture was preliminarily emulsified using a homomixer, and prototyping was then performed in a combinator. The prototyped margarine was evaluated.

(Hardness Evaluation)

The obtained article was cut into a cube having sides of 5±1 cm and put into an incubator at respective temperatures, and the hardness after 24 hours was measured. The hardness was measured by pressing a plunger with a diameter of 1 cm at a speed of 5 cm/min using "Rheometer" (commercially available from FUDOU kougyou, Inc.). The results are shown in Table 4.

TABLE 4

| | 5° C. | 10° C. | 15° C. | 20° C. |
|---|---|---|---|---|
| Example 1 | 1020 | 740 | 600 | 440 |
| Comparative Example 1 | 340 | 240 | 180 | — |
| Comparative Example 2 | 160 | 180 | 160 | — |

(unit: g)

A temperature at which the hardness was about 400 g was determined as an optimal use article temperature. In Example 1, the optimal use article temperature was 20° C. It can be understood that Example 1 can be applied to a very wide range of usage environments. On the other hand, in Comparative Examples 1 and 2, the optimal use article temperature was 5° C. or lower, and Comparative Examples 1 and 2 can be used only in limited usage environments.

Next, margarine refrigerated at 5° C. for 48 hours was evaluated as shown in Table 5.

TABLE 5

| | Plasticity | Elasticity | Gloss | Bleed-out of liquid oil | Graining | Heat resistance | Mouthfeel |
|---|---|---|---|---|---|---|---|
| Example 1 | ○ | ○ | ○ | ○ | ○ | ○ | ○ |
| Comparative Example 1 | ○ | ○ | ○ | ○ | Δ | ○ | Δ |
| Comparative Example 2 | ○ | × | ○ | ○ | Δ | ○ | Δ |

Evaluation method
○: Favorable
Δ: Poor
×: Very poor

The margarine prototyped in Example 1 had no graining, but had elasticity and heat resistance, and showed favorable quality in all evaluations.

In Comparative Example 1, margarine having plasticity and elasticity was prototyped. Graining occurred, and poorer mouthfeel properties than in Example 1 resulted.

In the margarine prototyped in Comparative Example 2, the hardness was somewhat inferior and elasticity was almost absent.

Comprehensive evaluation results are summarized in Table 6.

TABLE 6

| | Margarine evaluation | | | |
|---|---|---|---|---|
| | SFC % | Solidification rate of oils and fats | Mouthfeel | Physical properties after storage | Comprehensive evaluation |
| Example 1 | ○ | ○ | ○ | ○ | ○ |
| Comparative Example 1 | ○ | × | ○ | Δ | × |
| Comparative Example 2 | ○ | × | ○ | × | × |
| Comparative Example 3 | × | — | — | — | × |
| Comparative Example 4 | × | — | — | — | × |

In Example 1, an SFC % at 30° C. or 35° C. affecting mouthfeel properties was relatively low at 11.2% or 9.3%, and the oil and fat solidification rate was favorable compared to the solidification rates of Comparative Examples 1 and 2.

In addition, the margarine prototype in Example 1 had favorable physical properties that can be applied to a very wide range of usage environments, and had excellent levels of mouthfeel properties of margarine and physical properties.

Since Comparative Examples 1 and 2 had an inferior solidification rate to Example 1, the comprehensive evaluation was determined not to be satisfactory.

In Comparative Examples 3 and 4, an SFC % at 30° C. or 35° C. was high at 14.1% or 15.7%, and influenced mouthfeel properties in margarine, and thus these comparative examples were determined not to be satisfactory.

Example 2 and Example 3

Oil and fat raw materials were mixed in so that contents of saturated fatty acids and unsaturated fatty acids, and contents of C12, C16, C18, C18:1, and C22 were those shown in Table 7, and then a chemical transesterification reaction was caused.

Example 2 was prepared according to a chemical transesterification reaction of oils and fats with a formulation of 70 weight % of extremely hardened palm oil, 5 weight % of extremely hardened high erucic acid rapeseed oil, and 25 weight % of sunflower oil.

Example 3 was prepared according to a chemical transesterification reaction of oils and fats with a formulation of 67 weight % of extremely hardened palm oil, 5 weight % of extremely hardened high erucic acid rapeseed oil, and 28 weight % of sunflower oil.

In addition, 30 to 5 weight % of the non-selective transesterified oil of Example 2 and Example 3 and 70 to 95 weight % of rapeseed oil were mixed in and a total content of saturated fatty acids was adjusted to 23%, and thereby a plastic oil and fat composition of the present invention was obtained.

TABLE 7

| | Content of unsaturated fatty acids | Content of saturated fatty acids | C12 | C16 | C18 | C18:1 | C22 | C16/C18 | C18/C22 | C16/C22 |
|---|---|---|---|---|---|---|---|---|---|---|
| Example 2 | 23.0 | 77.0 | 0.2 | 31.9 | 40.5 | 21.7 | 2.9 | 0.8 | 14.2 | 11.2 |
| Example 3 | 25.7 | 74.3 | 0.2 | 30.7 | 39.0 | 24.3 | 2.9 | 0.8 | 14.3 | 10.7 |

The non-selective transesterified oils of Example 2 and Example 3 satisfied all of the following (1) to (3).

(1) Content of saturated fatty acids in constituent fatty acids was 70 to 85 weight %
(2) C12 was less than 10 weight %
(3) Content of unsaturated fatty acids in constituent fatty acids was 15 to 30 weight %

In the non-selective transesterified oils of Example 2 and Example 3, the content of C18:1 was 10 to 25 weight %.

The non-selective transesterified oils of Example 2 and Example 3 satisfied all of the following formulae:

$$0.2 \leq C16/C18 \leq 2.0$$

$$5.0 \leq C16/C22 \leq 30.0$$

$$5.0 \leq C18/C22.$$

Here, the plastic oil and fat composition in which hardstocks of Example 2 and Example 3 were prepared in the same manner as in Example 1 had an SFC and oil and fat solidification rate in favorable ranges as in Example 1.

In addition, when margarine prepared using the plastic oil and fat composition was evaluated, mouthfeel properties and physical properties after storage were favorable.

INDUSTRIAL APPLICABILITY

According to the present invention, it is possible to obtain transesterified oils having small contents of saturated fatty acids and trans acids and favorable physical properties as a hardstock for a plastic oil and fat composition and a plastic oil and fat composition using the same.

The invention claimed is:

1. A non-selective transesterified oil in which a content of saturated fatty acids in constituent fatty acids is 70 to 85 weight %, a content of saturated fatty acids having 12 carbon atoms (hereinafter referred to as C12) is less than 10 weight %, a content of unsaturated fatty acids in constituent fatty acids is 15 to 30 weight %, a rising melting point is 45° C. to 60° C., and wherein compositional ratios between saturated fatty acids having 16 carbon atoms (hereinafter referred to as C16), saturated fatty acids having 18 carbon atoms (hereinafter referred to as C18), and saturated fatty acids having 22 carbon atoms (hereinafter referred to as C22) satisfy all of the following formulae:

$$0.2 \leq C16/C18 \leq 2.0$$

$$5.0 \leq C16/C22 \leq 30.0$$

$$5.0 \leq C18/C22.$$

2. The non-selective transesterified oil according to claim 1,
wherein a content of monounsaturated fatty acids having 18 carbon atoms (hereinafter referred to as C18:1) is 10 to 25 weight %.

3. A plastic oil and fat composition, containing 30 to 5 weight % of the non-selective transesterified oil according to claim 1, and 70 to 95 weight % of a liquid oil.

4. The plastic oil and fat composition according to claim 3,
wherein a content of saturated fatty acids in the plastic oil and fat composition is 25 weight % or less.

5. The plastic oil and fat composition according to claim 3,
wherein a content of trans acids in the plastic oil and fat composition is 2.0 g/100 g or less.

6. The plastic oil and fat composition according to claim 3,
wherein, when the plastic oil and fat composition is melted at 60° C. and then left at 15° C., and a time taken for an SFC % of oils and fats to reach 14% is within 10 minutes.

7. A plastic oil and fat composition, containing 30 to 5 weight % of the non-selective transesterified oil according to claim 2, and 70 to 95 weight % of a liquid oil.

8. The plastic oil and fat composition according to claim 4,
wherein a content of trans acids in the plastic oil and fat composition is 2.0 g/100 g or less.

9. The plastic oil and fat composition according to claim 4,
wherein, when the plastic oil and fat composition is melted at 60° C. and then left at 15° C., and a time taken for an SFC % of oils and fats to reach 14% is within 10 minutes.

10. The plastic oil and fat composition according to claim 5,
wherein, when the plastic oil and fat composition is melted at 60° C. and then left at 15° C., and a time taken for an SFC % of oils and fats to reach 14% is within 10 minutes.

* * * * *